(12) United States Patent
Christ et al.

(10) Patent No.: US 11,571,930 B2
(45) Date of Patent: Feb. 7, 2023

(54) AXLE SYSTEM

(71) Applicant: SAF-HOLLAND GmbH, Bessenbach (DE)

(72) Inventors: Armin Christ, Bessenbach (DE); Rainer Stegmann, Hösbach (DE)

(73) Assignee: SAF-HOLLAND GmbH, Bessenbach (DE)

( * ) Notice: Subject to any disclaimer, the term of this patent is extended or adjusted under 35 U.S.C. 154(b) by 607 days.

(21) Appl. No.: 16/603,090

(22) PCT Filed: Apr. 3, 2018

(86) PCT No.: PCT/EP2018/058405
§ 371 (c)(1),
(2) Date: Oct. 4, 2019

(87) PCT Pub. No.: WO2018/185057
PCT Pub. Date: Oct. 11, 2018

(65) Prior Publication Data
US 2020/0070575 A1     Mar. 5, 2020

(30) Foreign Application Priority Data
Apr. 4, 2017   (DE) .................... 10 2017 107 207.1

(51) Int. Cl.
*B60B 35/08*     (2006.01)
*B60B 35/04*     (2006.01)

(52) U.S. Cl.
CPC ............. *B60B 35/08* (2013.01); *B60B 35/04* (2013.01); *B60B 2900/115* (2013.01)

(58) Field of Classification Search
CPC .......... B60B 35/02; B60B 35/04; B60B 35/08
USPC ................................................. 301/131–132
See application file for complete search history.

(56) References Cited

U.S. PATENT DOCUMENTS

| | | | | |
|---|---|---|---|---|
| 128,127 A * | 6/1872 | Daniels | ................. | B60B 35/025 301/131 |
| 306,214 A * | 10/1884 | Blount | ......................... | 301/132 |
| 1,431,302 A | 10/1922 | Gyllin | | |
| 1,564,628 A * | 12/1925 | Rowe | ..................... | B60B 35/04 295/9.1 |
| 2,155,156 A * | 4/1939 | Townsend | ............... | B60B 35/04 301/132 |
| 2,164,554 A * | 7/1939 | Tollefson | ................ | B60B 35/14 301/132 |

(Continued)

FOREIGN PATENT DOCUMENTS

| | | |
|---|---|---|
| DE | 201 19 640 U1 | 2/2002 |
| DE | 201 19 641 U1 | 2/2002 |

(Continued)

OTHER PUBLICATIONS

European Patent Office; International Search Report; dated Jul. 12, 2018.

*Primary Examiner* — Jason R Bellinger
(74) *Attorney, Agent, or Firm* — Price Heneveld LLP

(57) ABSTRACT

An axle system includes an axle stub and a clamping unit, the axle stub being formed in a substantially rotationally symmetrical manner about a stub axis, the clamping unit in an assembled state transmitting a clamping force to the axle stub, the clamping unit and the axle stub in the assembled state being secured non-positively to prevent movement relative to one another.

21 Claims, 5 Drawing Sheets

(56) References Cited

U.S. PATENT DOCUMENTS

| | | | | |
|---|---|---|---|---|
| 4,080,003 | A * | 3/1978 | Boughton | B60B 35/02 403/267 |
| 4,828,328 | A * | 5/1989 | Bowman | B60B 35/02 301/124.1 |
| 4,890,889 | A * | 1/1990 | Burgett | B60B 35/14 301/132 |
| 6,926,371 | B1 * | 8/2005 | Gagnon | B60B 35/04 301/124.1 |
| 7,108,336 | B2 * | 9/2006 | Dombroski | B60B 35/14 301/124.1 |
| 7,229,137 | B2 * | 6/2007 | Roberts | B60B 35/04 188/73.46 |
| 7,260,879 | B2 * | 8/2007 | Koschinat | B60B 35/02 301/124.1 |
| 10,525,769 | B2 * | 1/2020 | Gregg | B23K 26/21 |
| 11,241,911 | B2 * | 2/2022 | Gagnon | B60B 35/001 |
| 2006/0001312 | A1 | 1/2006 | MacKarvich | |
| 2015/0108827 | A1 * | 4/2015 | Beauchamp | B60B 35/00 301/132 |

FOREIGN PATENT DOCUMENTS

| | | |
|---|---|---|
| DE | 10 2005 038 275 A1 | 2/2007 |
| DE | 10 2010 001 695 A1 | 8/2011 |
| DE | 10 2012 216 245 A1 | 3/2014 |
| DE | 102014218159 A1 | 3/2016 |
| DE | 102014218332 A1 | 3/2016 |

* cited by examiner

AXLE SYSTEM

BACKGROUND OF THE INVENTION

The present invention relates to an axle system for commercial vehicles.

Axle systems disclosed by the prior art often use a rigid axle tube to which an axle stub is firmly welded, at least one vehicle wheel of the commercial vehicle being rotatably fastened to the axle stub. Brake carriers are furthermore firmly welded to the axle systems disclosed by the prior art, particularly in order to secure a disk brake or a drum brake. A disadvantage in the axle systems disclosed by the prior is that the introduction of weld seams at multiple points in the highly stressed union comprising the axle stub and axle tube gives rise to local material stresses, which reduce the elastic deformability of the material and which in particular increase the risk of a brittle fracture. Furthermore, the axle systems disclosed by the prior art cannot be dismantled in order, for example, to replace individual components or to adapt to new conditions of use.

The object of the present invention is to provide an axle system in which the individual components of the axle system can be connected to one another without the detrimental introduction of weld seams, and separated from one another again.

SUMMARY OF THE INVENTION

According to the invention the axle system comprises an axle stub and a clamping unit, the axle stub being formed in a substantially rotationally symmetrical manner about a stub axis, the clamping unit in an assembled state transmitting a clamping force to the axle stub, and the clamping unit and the axle stub in the assembled state being secured non-positively to prevent movement relative to one another. In a first embodiment according to the invention the axle system comprises at least an axle stub and a clamping unit. The clamping unit in this embodiment is preferably a brake carrier, which is designed for securing a disk brake or a drum brake. Here the axle tube and the clamping unit are connected to one another via an at least non-positive connection, in such a way that it is possible for high flexural moments and torques to be transmitted from the brake carrier to the axle stub. The present invention provides for the transmission of force from the clamping unit to the axle stub either directly, that is to say without any intermediate transmitting elements, or indirectly, that is to via intermediate elements or intermediate areas arranged between the clamping unit and the axle stub. The axle stub is formed in a substantially rotationally symmetrical manner, which means that, in particular, the external geometry in the area of engagement with the clamping unit is preferably of rotationally symmetrical formation about a stub axis. At the same time, however, the axle stub may comprise hydraulic ducts, for example, for supplying a drive unit fixed to the axle stub, which in their arrangement provided in the axle stub are not rotationally symmetrical about a stub axis. The formation of the axle stub as a rotationally symmetrical component has the advantage that this axle stub is particularly easy to manufacture. The advantage of a clamped connection between the clamping unit, preferably a brake carrier, and the axle stub is that the axle stub is not weakened by the introduction of one or more weld seams in the highly sensitive area where force is transmitted between the clamping unit and the axle stub. Moreover, it is possible, particularly in order to update the brake system of a commercial vehicle, for example, to remove the clamping unit from the axle stub and replace it with another clamping unit.

The clamping unit and the axle stub advantageously each comprise engagement devices, the engagement devices being designed in the assembled state to secure the clamping unit and the axle stub by positive interlock, to prevent rotation relative to one another about the stub axis. A particularly suitable engagement device here is a fluting, which is provided on the inside or on the faces of the clamping unit facing the axle stub and which partially digs into the material of the axle stub and therefore produces a positive interlock between the clamping unit and the axle stub, or which can be brought into engagement with a corresponding fluting provided on the axle stub, in order to prevent a rotation of the clamping unit relative to the axle stub about the stub axis. The engagement devices therefore more preferably form an undercut between the clamping unit and the axle stub, which acts in a tangential direction of a circle drawn around the stub axis and prevents a rotation in this tangential direction. In this way, by combining the non-positive connection of the clamping unit to the axle stub with a positive interlock, it is possible to achieve an additional increase in the strength of the connection between the two components. At the same time such engagement devices are especially easy to produce, particularly through surface machining with a knurling tool, which may be performed as a single turning operation both on the clamping unit and on the axle stub. The manufacture of the axle system can therefore be significantly simplified and rendered more cost effective, particularly in comparison with the production of a welded connection.

An axle tube is preferably provided which is formed in a substantially rotationally symmetrical manner about a tube axis, the axle tube and the axle stub being designed in such a way that in the assembled state the axle tube can be clamped against the axle stub by means of the clamping unit, in such a way that the stub axis and the tube axis run collinearly with one another. The assembled state is the state of the axle system, in which the components involved, the axle stub, the clamping unit and preferably the axle tube, are fixed to one another non-positively and/or by positive interlock. In contrast to this, the disassembled state of the axle system is the state of the individual components in the absence of a non-positive and/or positively interlocking engagement. The axle tube is preferably the rigid axle of a commercial vehicle, which is more preferably of rotationally symmetrical formation about the tube axis. In an alternative embodiment the tube axis may also be mirror-symmetrical in relation to one or more planes that intersect in the tube axis. For example, the axle tube may have a substantially rectangular cross section or a rectangular cross section provided with radiused corners. The axle tube more preferably has a cross section which does not vary substantially along the tube axis. The clamping force applied by the clamping unit is preferably transmitted to the axle stub indirectly via the axle tube, the axle tube and the axle stub also being fixed to one another at the same time. In this way it is possible to produce a non-positively interconnected union comprising the axle tube, the axle stub and the clamping unit, which hitherto could be produced only by means of a welded connection.

The axle tube and the axle stub can more preferably be brought into interlocking engagement, the clamping unit comprising a threaded pin, which engages in an aperture on the axle tube and can be clamped against a supporting surface on the axle stub, the threaded shank in the assembled state of the axle system securing the axle tube and the axle stub to one another in a positively interlocking engagement. In a preferred embodiment of the axle system the axle tube and the axle stub can be brought into positively interlocking engagement with one another. Together with the positive interlock a non-positive connection is advantageously also produced. An overlapping area, which is furnished with a thread, for example, is more preferably provided at least in some area between the axle tube and the axle stub, preferably allowing the axle stub to be screwed into the axle tube. In addition, a supporting surface is preferably provided on the axle stub on which a threaded pin, screwed into an aperture on the axle tube, can find support, in order to secure the axle tube and the axle stub in the position relative to one another in which there is a positively interlocking engagement between the axle tube and the axle stub. In other words, the threaded pin serves for locking the axle tube on the axle stub in the state in which the axle stub is fully screwed into the axle tube. In this preferred embodiment, therefore, the threaded pin forms a clamping unit, which through an interlocking and non-positive support on the axle stub prevents the axle stub from shifting relative to the axle tube and at the same time transmits a clamping force from the axle tube to the axle stub. It goes without saying that the clamping unit may additionally comprise further clamping elements, which act externally on the axle tube and/or the axle stub, in order to be able to fix other systems on the axle system.

The axle stub can advantageously be inserted into the axle tube in such a way that a holding plane running at right angles to the stub axis intersects the axle stub, the axle tube and the clamping unit. In other words, there is preferably an overlap between the axle stub and the axle tube in the area in which the clamping unit acts on the axle tube, or preferably on the axle tube and the axle stub. The axle stub here may advantageously be oversized in relation to the aperture of the axle tube, so that simply by inserting it into the axle tube it is already held non-positively on the latter. In addition to this connection between the axle stub and the axle tube, the clamping unit is preferably used to transmit an external force, preferably a surface force, to the axle tube, which additionally reinforces the connection between the axle stub and the axle tube. In this way an especially secure union can be produced between the axle stub and the axle tube, the clamping unit affording the additional advantage that further systems, such as a brake system, for example, can be secured non-positively to the axle stub/axle tube union.

In an overlapping area with the axle stub the axle tube more preferably comprises at least one slot, the main direction in which the slot extends running substantially parallel to the tube axis. The slot is preferably introduced in the area of the axle tube in which the axle tube transmits the force applied by the clamping unit to the axle stub. In clamping the axle tube against the axle stub, the cross section of the axle tube is preferably reduced about the tube axis or in a plane perpendicular to the tube axis, in order to produce the undersize of the aperture of the axle tube relative to the external dimensions of the axle stub. In order to afford the corresponding space for this reduction in cross section, without thereby producing any distortions in the material of the axle tube, the axle tube may be deformed in such a way that the slot diminishes or completely closes when clamping the axle tube. A multiplicity of slots, preferably uniformly distributed over the circumference of the axle tube, may preferably be provided, in order to achieve a particularly even deformation when pressing the axle tube onto the axle stub. In this way the material stresses occurring in the axle tube can be significantly reduced, whilst nevertheless allowing the transmission of a high clamping force between the clamping unit and the axle tube. In a particularly preferred embodiment the axle stub, in the area of the one slot or multiple slots where the axle tube overlaps with the axle tube, may comprise a projection, corresponding in shape to each slot, which at the same time affords a safeguard to prevent the axle tube and the axle stub twisting.

In a further preferred embodiment the axle stub and the axle tube can be clamped against one another in such a way that the contact area between the two components lies substantially in a holding plane running at right angles to the stub axis, the clamping unit being formed mirror-symmetrically about the holding plane and/or being intersected by the holding plane. Alternatively or in addition to the overlapping of the axle stub and of the axle tube in such a way that the two components are intersected by a holding plane, the axle stub and the axle tube may also comprise two corresponding projections, on which the clamping unit engages, in order to press the axle stub and the axle tube against one another in such a way that the contact area between the two components lies substantially in a holding plane running at right angles to the stub axis and/or the tube axis. The advantage of this embodiment is that the lever arm of the holding force acting between the axle tube and the axle stub, which is applied by the clamping unit, is particularly great and higher flexural moments can therefore be applied for a comparatively low holding force. In other words, the area in which the clamping unit transmits a clamping force to the axle stub and the axle tube is situated as far away as possible from the stub axis and the tube axis. What makes this embodiment more preferable is that no great overlap is required between the axle stub and the axle tube, thereby affording savings in material, especially on the axle stub. As a result, the weight of the axle system can be reduced.

The axle stub preferably comprises a locking portion, which is designed in the assembled state to engage through positive interlock and/or non-positively on the axle tube. Here the locking portion preferably forms an overlap with the axle tube, as has already been previously described. The locking portion is furthermore preferably of a conical or truncated pyramid-shaped formation, in order not only to engage by positive interlock in a corresponding aperture of the axle tube, but preferably also to allow it to be jammed in. In this way it is possible, by applying a clamping force, which presses the axle stub into the axle tube along or parallel to the stub axis and to the tube axis, to establish a clamping force between the axle stub and the axle tube which affords an additional safeguard to prevent dislocation between the two components. In this way it is possible, particularly in combination with a clamping unit which applies a clamping force acting parallel to the tube axis and the stub axis, to produce an especially solid connection between the axle tube and the axle stub.

In some areas the locking portion is preferably of conical or pyramid-shaped formation. Here the height of the cone or the pyramid preferably runs collinearly with the stub axis. A cone allows the axle stub to be wedged into a substantially rotationally symmetrical internal geometry of the axle tube. A pyramid-shaped geometry recommends itself for engagement, in particular, with a rectangular cross section of the aperture of the axle tube, and at the same time to provide an especially good safeguard against torsion between the axle stub and the axle tube about the stub axis and/or the tube axis.

The clamping unit more preferably comprises a first clamp part and a second clamp part, the first clamp part and the second clamp part each comprising a clamping face, the first and the second clamp part in the assembled state being forced against one another by a force element and the clamping faces bearing on corresponding holding faces on the axle tube and/or on the axle stub. The clamping unit is therefore more preferably built up from two parts, which are preferably forced against one another by a force element and at the same time transmit a clamping force to the axle tube and/or the axle stub. In a first embodiment, in which the clamping unit acts directly on the axle stub, the respective clamping faces of the clamp parts therefore bear on the axle stub, producing an at least non-positive safeguard against dislocation by means of adhesion or frictional connection between the clamping faces and the corresponding holding face on the axle stub. The clamp parts may also preferably each bear and act both on the axle tube and on the axle stub, the clamp parts preferably comprising a plurality of clamping faces, which each engage with an opposing holding face provided on the axle tube and on the axle stub. A bolt having an external thread has proved particularly preferable as force element, which can be brought into engagement with an internal thread, the internal thread preferably being formed on an additionally provided nut or on one of the clamp parts. Alternatively, one of the clamp parts may preferably comprise a projection, which is provided with an external thread and by way of a corresponding nut element can be firmly clamped by positive interlock and non-positively to the respective opposing clamp part.

The clamping faces can preferably be brought into engagement with the axle tube, the axle tube being deformable in the area of the holding faces in such a way that it can be firmly clamped to the axle stub. In the assembled state of the axle system, therefore, the clamping face is more preferably clamped against the axle tube in such a way that the latter is deformed in the area of the holding face or holding faces, in such a way that at the same time it transmits a clamping force to the areas of the axle stub arranged inside the axle tube.

One of the clamp parts more preferably comprises a brake carrier. In a particularly preferred embodiment one of the clamp parts is designed in such a way that a brake carrier is integrally formed on the clamp part. It is therefore possible to integrate the two functions of brake carrier and clamping unit, thereby significantly reducing the overall weight of the axle system and also making the production of an axle system more cost-effective by reducing the number of parts required. The brake carrier preferably takes the form of a brake carrier of a disk brake and in its plane main direction of extent extends substantially transversally to the stub axis. Alternatively, the brake carrier may also be a brake carrier for a drum brake, both clamp parts in this preferred embodiment preferably each comprising a holding geometry of the brake carrier. Thus, the area of the brake carrier on which, for example, a clamping unit or the guide of an S-shaped cam is fixed, may be formed on the first clamp part. The second clamp part may preferably comprise the area of the brake carrier on which two brake shoes are pivotally supported in relation to one another in so-called pans.

At least one of the clamping faces preferably has an extent spanning a clamping angle with the stub axis in a plane of section intersecting the stub axis, the clamping angle being between 20° and 85° and preferably between 40° and 45°. At least one of the clamping faces on one of the clamp parts is therefore preferably divided into at least two parts, the parts of the clamping face corresponding to the respective opposing holding face being angled at an angle of at least 20° and at most 85° to one another. The clamping angle serves to adjust the ratio of the force acting parallel to the stub axis or to the tube axis, which is applied by the clamping unit, and the vertical component of the clamping force, which acts perpendicularly or at right angles to the stub axis or tube axis. At a preferred angle of 45°, therefore, the force transmitted to the respective holding faces on the axle tube and on the axle stub in the direction of the tube axis or at right angles to the tube or stub axis is the same as the force of the clamping unit acting parallel to the tube and stub axis.

One of the clamp parts preferably comprises an internal thread, with which the force element can be made to engage. This preferred embodiment reduces the number of axle system components required and therefore the manufacturing costs for these, since it is possible to dispense with an additional nut.

Two clamping faces are advantageously provided on each clamp part, which form a V-shape with one another, the open side of the Vs in the assembled state supporting a holding face on the axle tube and a holding face on the axle stub. This configuration of the clamp parts allows a combination of a positive interlock, acting along the tube axis and/or stub axis, with the non-positive connection of the clamp parts to the axle tube and the axle stub, which acts transversely to the tube axis and/or stub axis. The overall strength of the axle system can thereby be increased.

In the unassembled state the clamping unit is preferably undersized compared to the assembled state. Here, the clamp parts of the clamping unit, in the state in which they are not yet pressed against the axle tube or the axle stub, more preferably have a smaller diameter, or in other words a smaller radius of curvature of their clamping faces, than in the state in which the clamping unit transmits a clamping force to the axle tube and/or the axle stub. In this way, in addition to the clamping force applied by the force element, it is also possible for the clamping unit itself, through elastic deformation, to generate a clamping force acting on the axle tube and/or the axle stub, which affords an additional safeguard against dislocation of the clamping unit relative to the axle tube and/or the axle stub.

BRIEF DESCRIPTION OF THE DRAWINGS

Further advantages and features emerge from the following description, referring to the figures attached. It goes without saying that individual features which are represented only in one of the embodiments can also be applied in other embodiments in other figures, unless this has been explicitly excluded or is ruled out due to technical considerations. In the drawings.

DESCRIPTION OF THE PREFERRED EMBODIMENTS

Figure 1:
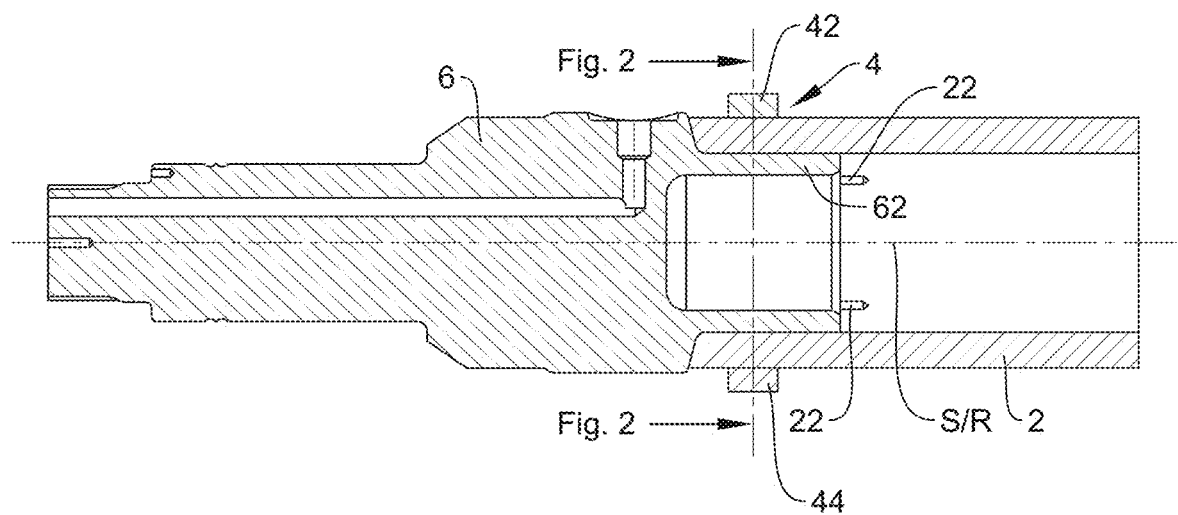
FIG. 1 shows a sectional view of a first preferred embodiment of the axle system according to the invention.
Figure 2:
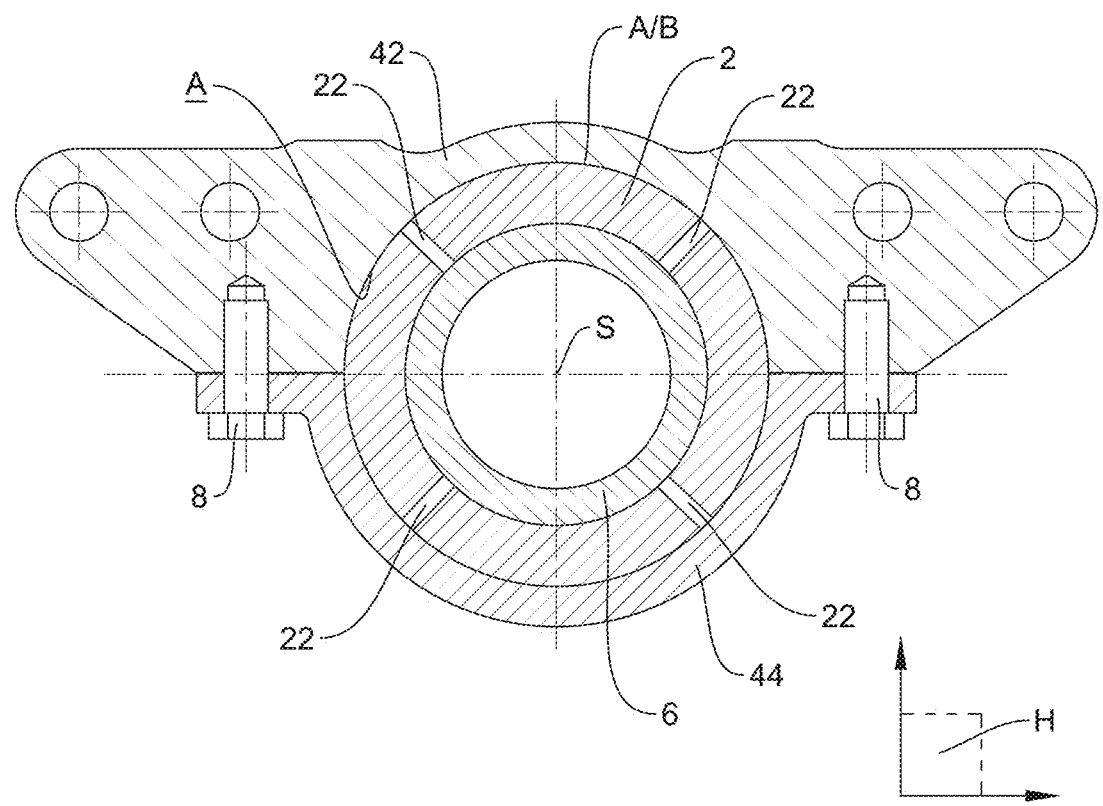
FIG. 2 shows a sectional view of the preferred embodiment shown in FIG. 1 in the plane of section identified in FIG. 1.

The exemplary embodiment of an axle system according to the invention shown in FIG. 1 comprises an axle stub 6 and an axle tube 2, areas of which are pushed into one another in an overlapping area. In the overlapping area the axle stub preferably comprises a locking portion 62, which has a smaller diameter than the remaining area of the axle stub 6. In the area of the overlap between the axle tube 2 and the axle stub 6 a clamping unit 4 acts on the axle tube 2. The clamping unit 4 here comprises a first clamp part 42 and a second clamp part 44, which are forced against one another by the force element 8 shown in FIG. 2 and therefore transmit a clamping force to the axle tube 2. The axle tube 2 further comprises at least one slot 22, which has a main extent running substantially parallel to the stub axis S and/or tube axis R. In the embodiment shown in FIGS. 1 and 2 there are more preferably four slots 22, which are uniformly distributed over the circumference of the axle tube 2, as represented in FIG. 2. The slots 22 serve, in particular, to facilitate the deformation of the axle tube 2 in the area in which the clamping unit 4 transmits a clamping force to the axle tube 2 and forces this against the axle stub 6. FIG. 1 furthermore shows that the axle stub 6 comprises at least one hydraulic duct (no reference numeral), which in its longitudinal duct substantially parallel to the stub axis S and comprises a transverse duct, which emerges from the circumferential surface of the axle stub 6 shortly before the overlapping area with the axle tube 2. This hydraulic duct serves to supply a drive unit, in particular a hydrostatic auxiliary motor, that can be fixed to the left-hand remote end of the axle stub 6. The present invention is particularly suited to such axle stubs 6, on which filigree structures such as hydraulic ducts are introduced, since the clamping unit 4 makes it possible to dispense with the introduction of weld seams, which can introduce dangerous temperature stresses into the material of the axle stub 6 and may damage and the filigree structures.

FIG. 2 shows the embodiment of the axle system according to the invention represented in FIG. 1. The clamping unit 4 comprises a first clamp part 42, which advantageously takes the form of a brake carrier. This brake carrier is of a flange-like, two-dimensional formation extending substantially transversely to the stub axis and transversely to the tube axis R, and forms a flange for fixing a brake system. In the exemplary embodiment shown in FIG. 2 the first clamp part 42 is, in particular, designed as a brake carrier for a disk brake. Also formed on the first brake part 42 is the clamping face A, which engages non-positively with a corresponding holding face B on the axle tube 2. The second clamp part 44 is designed as a simple and in part U-shaped shackle, which at each of its respective remote ends comprises a flange portion to allow the passage of a force element 8. The force elements 8 here engage in an internal thread preferably formed on the first clamp part 42, so that the force elements 8 apply a clamping force between the first clamp part 42 and the second clamp part 44. The plane of section of the view shown in FIG. 2 is the holding plane H, which intersects the clamping unit 4, the axle tube 2 and the axle stub 6.

Figure 3:
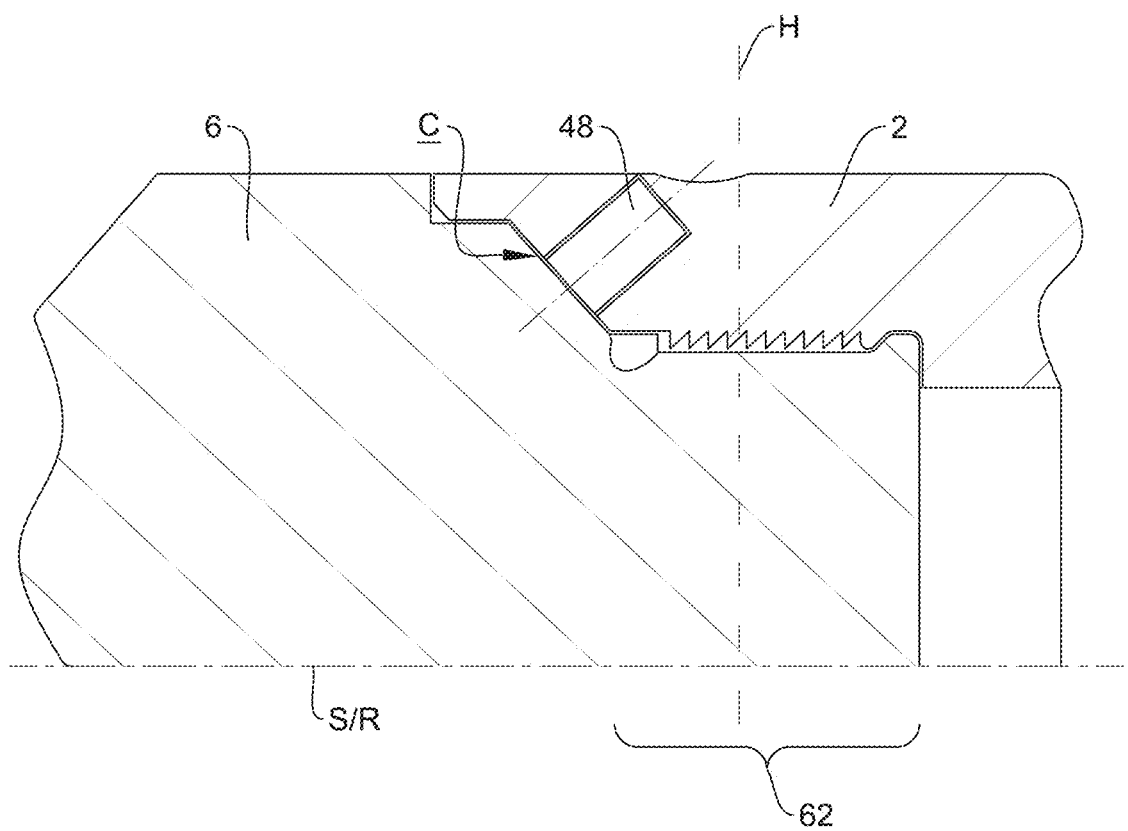
FIG. 3 shows a sectional view of a further preferred embodiment of the axle system according to the invention.

FIG. 3 shows a further preferred embodiment of the axle system according to the invention, the axle stub 6 in its locking portion 62 comprising an external thread, which engages by positive interlock and non-positively with a corresponding internal thread on the axle tube 2. In order for it to be held in this position, a threaded pin 48 is preferably, which is screwed into an aperture on the axle tube 2 having an internal thread and pressed against a supporting surface C on the axle stub 6. In this way the threaded pin 48 locks the axle stub 6 in relation to the axle tube 2 in the position in which the axle stub 6 is fully screwed into the axle tube 2.

Figure 4:
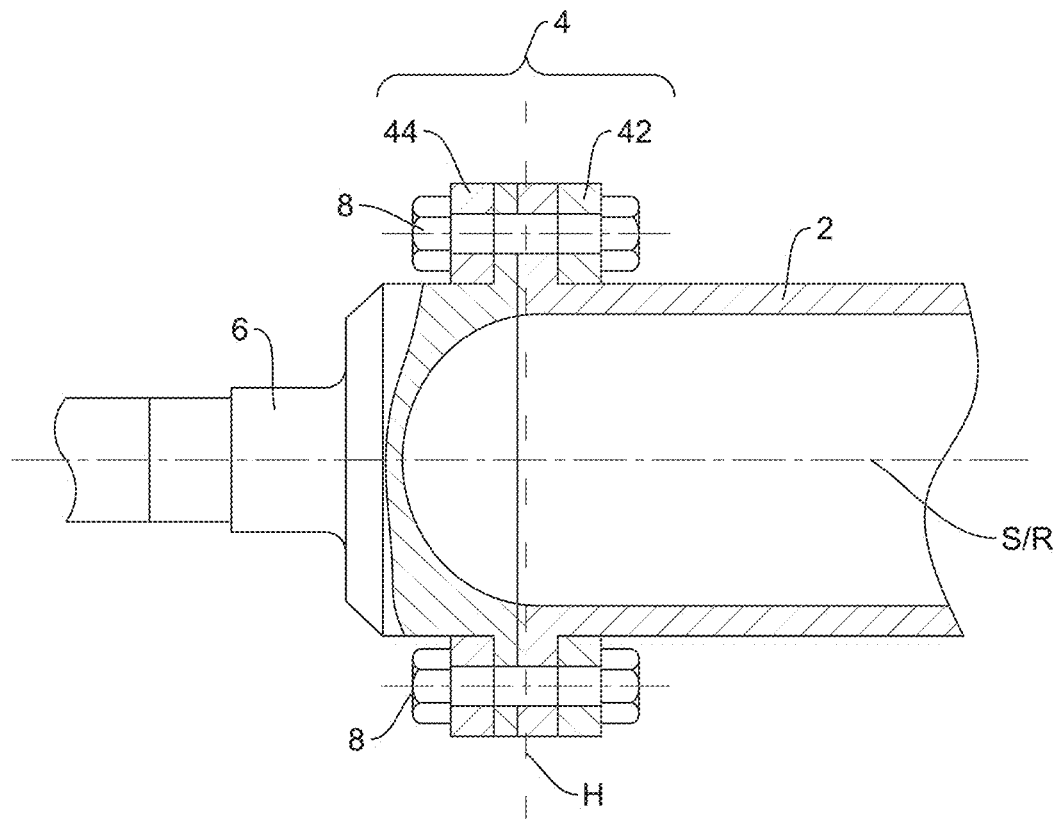
FIG. 4 shows a further sectional view of a preferred embodiment of the axle system according to the invention.

FIG. 4 shows a further alternatively preferred embodiment of the axle system according to the invention, in which the clamping unit 4 transmits a clamping force, acting parallel to the tube axis or stub axis S/R, to corresponding portions of the axle stub 6 and the axle tube 2. Here the axle stub 6 and the axle tube 2 are preferably pressed against one another in a contact area which lies parallel or in the holding plane H lying transversely to the stub axis S or tube axis R. In this preferred exemplary embodiment the axle stub 6 and the axle tube 2 preferably each comprise a flange like holding geometry which extends transversely to the stub axis S and tube axis R and on which the first clamp part 42 is applied from one side and the second clamp part 44 from the opposite side, force elements 8 being provided, which press the clamp parts 42, 44 against one another and therefore against the axle tube 2 and the axle stub 6. The advantage of this embodiment is that the force elements 8 by positive interlock prevent a rotational movement of the axle tube 2 relative to the axle stub 6 about the tube axis and stub axis R, S. The first clamp part 42 and the second clamp part 44 here are preferably designed as circular washers, in each of which a multiplicity of bores (two ae shown in FIG. 4) are introduced. It goes without saying that one of the clamp parts 42, 44 may also comprise a brake carrier, as represented in FIG. 2.

Figure 5:
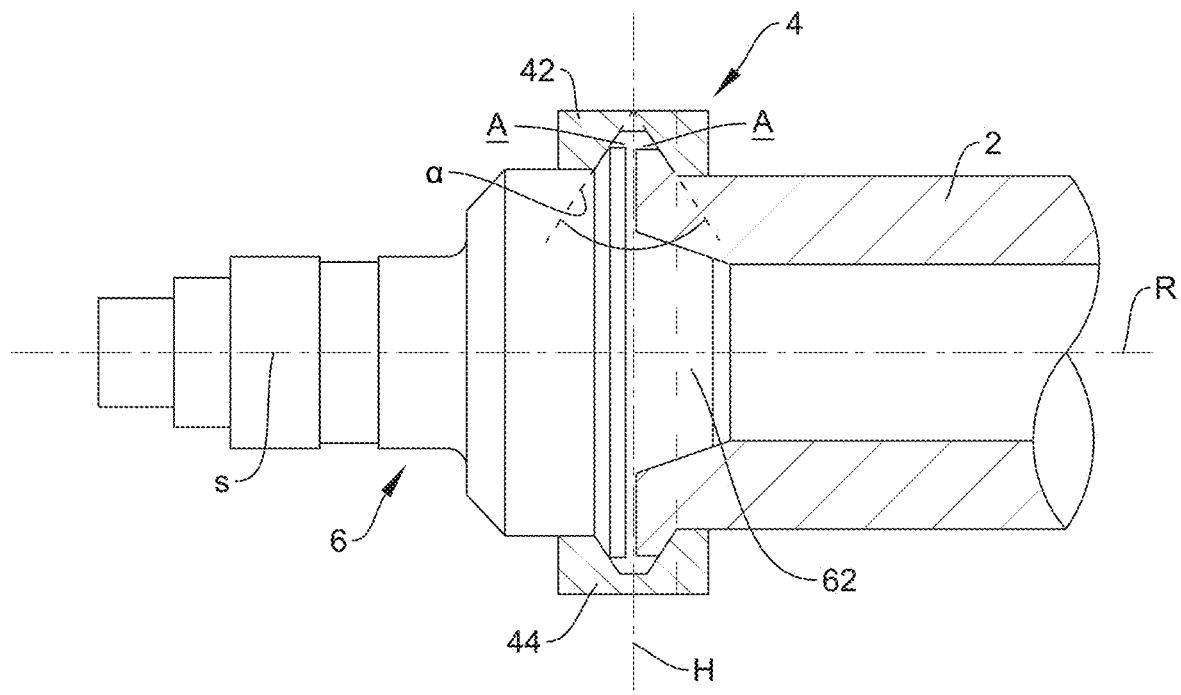
FIG. 5 shows a further sectional view of a preferred embodiment of the axle system according to the invention.

FIG. 5 shows a further preferred embodiment of the axle system according to the invention. The clamping unit 4 comprises a first clamp part 42 and a second clamp part 44, the clamp parts 42, 44 more preferably being of C-shaped or V-shaped formation. The clamping faces A of the first clamp part 42 and/or the second clamp part 44, facing one another at a clamping angle α of preferably 30° bis 40°, here force a flange formed on the axle stub 6 against the flange formed on the axle tube 2. In addition to this non-positive and positively interlocking fixing, the axle stub 6 comprises a locking portion 62, preferably of a conical shape, which is pressed into the aperture of the axle tube 2. Here therefore, the clamping unit 4 firstly applies the clamping force, which presses the axle stub 6 against the axle tube 2 parallel to or along the stub axis S or tube axis R, and at the same time also the force which presses the locking portion 62 of the axle stub 6 into the inside of the axle tube 2. In this way, and owing to the multiplicity of surfaces that form undercuts rubbing non-positively on one another and interlocking with one another, the clamping unit 4 is capable of producing an especially secure connection between the axle tube 2 and the axle stub 6. In the embodiment shown in FIG. 5, too, one or both of the clamp parts 42, 44 may comprise a brake carrier.

Figure 6:
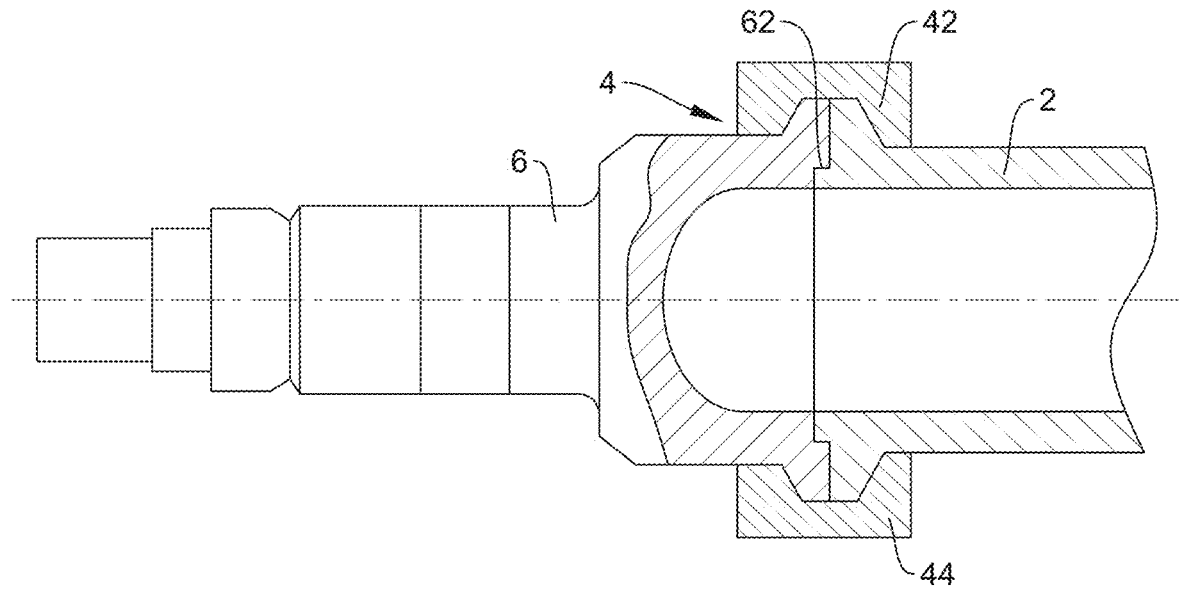
FIG. 6 shows a further sectional view of a preferred embodiment of the axle system according to the invention.

FIG. 6 shows a preferred embodiment of the axle system, which resembles the embodiment shown in FIG. 5. Here, instead of the locking portion 62 of the axle stub 6 in the form of a truncated cone, a geometry in the form of a step or offset is provided as locking portion 62 of the axle stub. The advantage of this embodiment compared to the embodiment shown in FIG. 5 is the substantially lower weight of the axle stub 6. At the same time, the clamping unit, as previously described, having inclined clamping faces A which preferably form a substantially V-shaped configuration with one another, is intended to force two flange-like portions on the axle tube 2 and on the axle stub 6 against one another, and therefore to prevent the axle stub 6 shifting relative to the axle tube 2.

Figure 7:
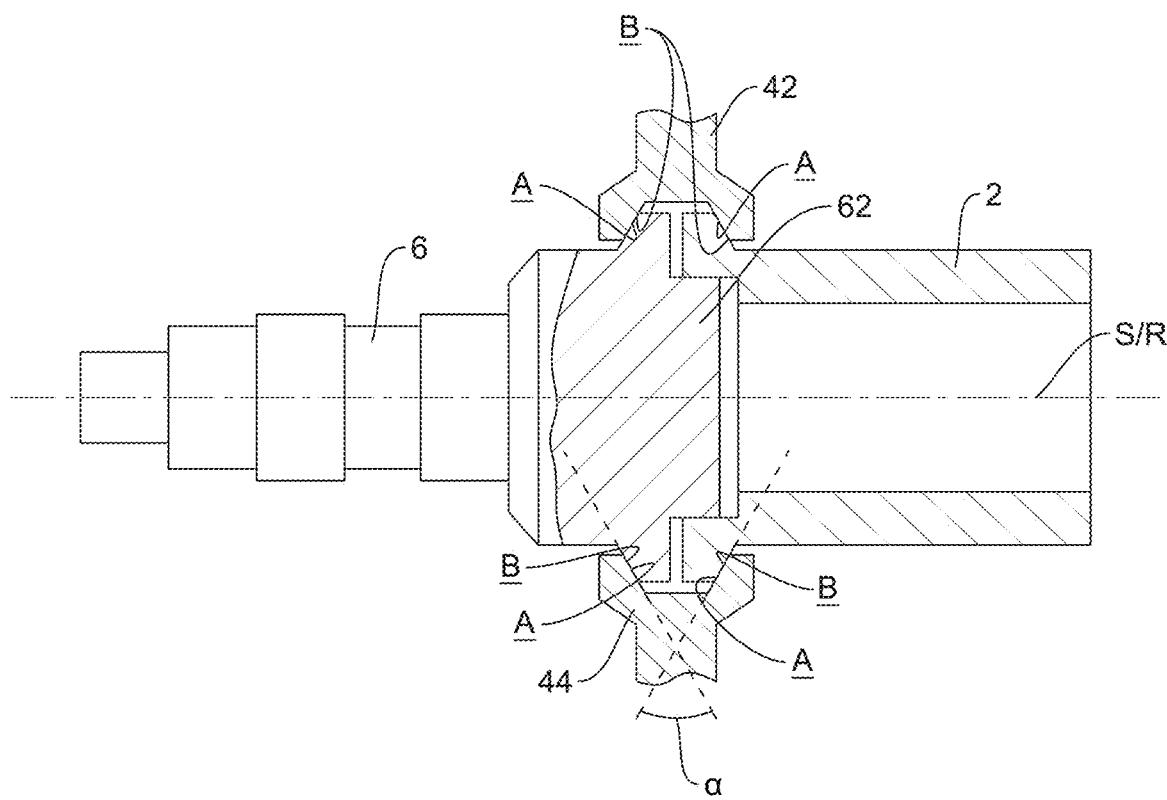
FIG. 7 shows a further sectional view of a preferred embodiment of the axle system according to the invention.

FIG. 7 shows a preferred embodiment of the axle system according to the invention in which, like the embodiment shown in FIG. 5, the axle stub 6 comprises a locking portion 62, which projects into the aperture of the axle tube 2. The locking portion 62 in this embodiment advantageously extends cylindrically, providing a positive interlock for the transmission of flexural moments between the axle tube 2 and the axle stub 6. It is indicated on the first clamp part 42 and on the second clamp part 44 that they both each extend still further transversely to the stub axis S and to the tube axis R, the two clamp parts 42, 44 each forming a partial area of a brake carrier for a drum brake. The holding faces B projecting outwards in the manner of a flange on the axle stub 6 and on the axle tube 2 are here also preferably inclined in relation to one another with approximately the same clamping angle α as the mutually inclined clamping faces A.

Figure 8:
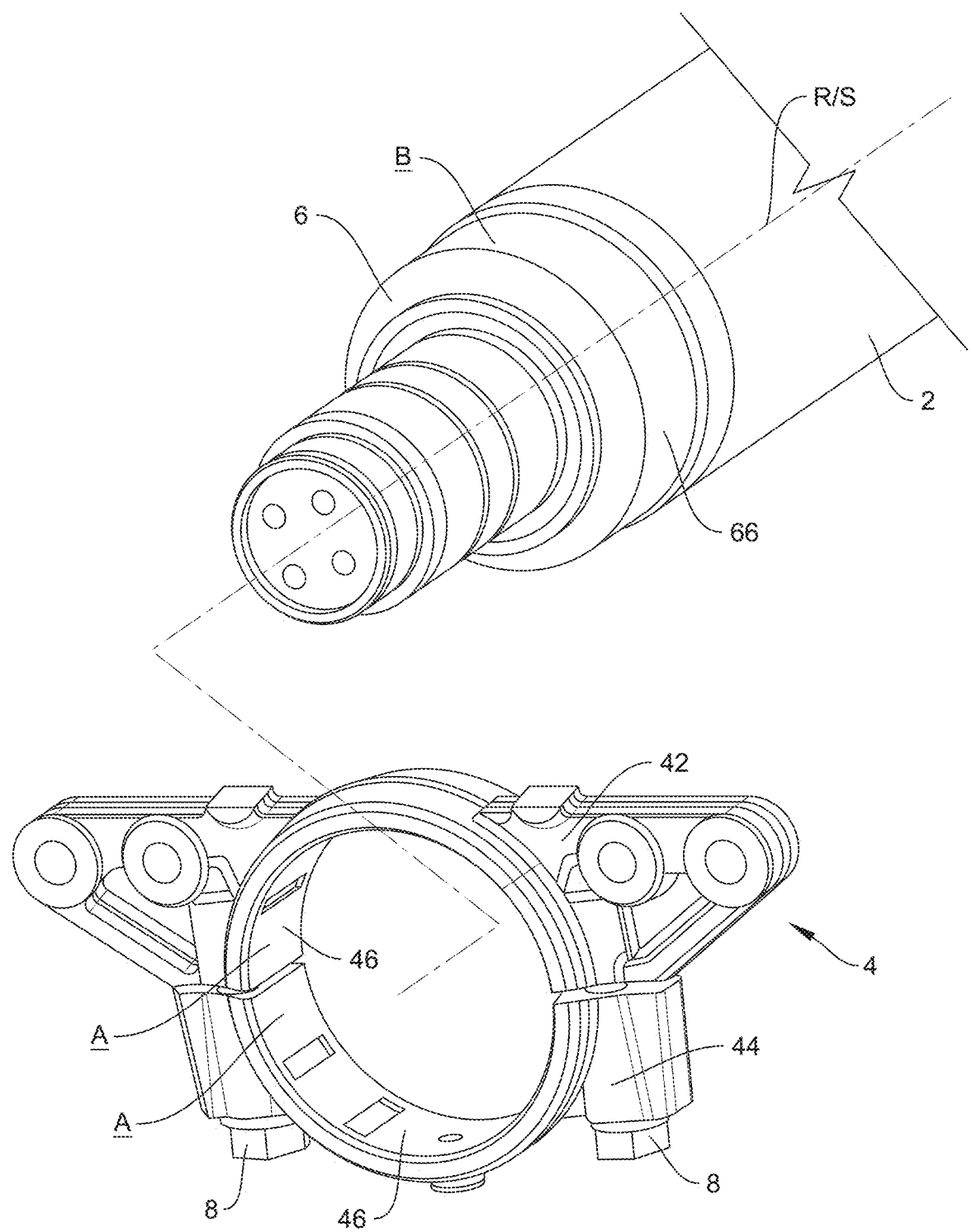
FIG. 8 shows an exploded perspective view of a preferred embodiment of the axle system according to the invention.

FIG. 8 shows a perspective view of an embodiment of the axle system, which resembles the embodiment shown in FIGS. 1 and 2. Here the clamping unit 4 and the union comprising the axle tube 2 and the axle stub 6 are shown separated from one another, in order to afford a better view of the clamping faces A and the holding face B. The first clamp part 42 is preferably formed as a brake carrier for a disk brake. Furthermore, an engagement device 46, which in the preferred case takes the form of a fluting or knurling, is provided on the clamping face A of the first clamp part 42 and on the clamping face A of the second clamp part 44. Similarly, and corresponding to this, the axle stub 6 in its holding face B likewise shows a knurling or fluting. In the assembled state, that is to say when the clamping unit is pressed against the axle stub 6, the engagement devices 46, 66 through a positive interlock provide for a stable torsion safeguard, which supports the non-positive connection between the clamping unit 4 and the axle stub 6.

REFERENCE NUMERALS

2—axle tube
22—slot
4—clamping unit
42—first clamp part
44—second clamp part
46—engagement device
48—threaded pin
6—axle stub
62—locking portion
66—engagement device
8—force element
α—clamping angle
A—clamping face
B—holding face
C—supporting surface
H—holding plane
R—tube axis
S—stub axis

The invention claimed is:

1. An axle system, comprising:
 an axle stub; and
 a clamping unit;
 wherein the axle stub is substantially rotationally symmetrical about a stub axis;
 wherein the clamping unit in an assembled state transmits a clamping force to the axle stub;
 wherein the clamping unit and the axle stub in the assembled state are secured at least by a force-fit to prevent movement relative to one another; and
 wherein the clamping unit comprises:
  a first clamp part; and
  a second clamp part;
  wherein the first clamp part and the second clamp part each comprise a clamping face; and
  a force element configured to engage the first and second clamp parts and force the first and the second clamp parts in the assembled state against one another, wherein the clamping faces bear on corresponding holding faces on an axle tube and/or on the axle stub;
  wherein at least one of the clamping faces has an extent spanning a clamping angle with the stub axis in a plane of section intersecting the stub axis; and
  wherein the clamping angle is between 20° and 85°.

2. The axle system as claimed in claim 1, wherein the clamping unit and the axle stub each comprise engagement devices, and wherein the engagement devices are configured to secure the clamping unit and the axle stub in the assembled state by positive interlock to prevent rotation relative to one another about the stub axis.

3. The axle system as claimed in claim 2, wherein the axle tube that is substantially rotationally symmetrical about a tube axis, and wherein the axle tube is configured to be clamped against the axle stub by the clamping unit when in the assembled state, such that the stub axis and the tube axis run collinearly with one another.

4. The axle system as claimed in claim 3, wherein the axle tube and the axle stub are configured to be brought into interlocking engagement, the clamping unit comprises a threaded pin, which engages in an aperture on the axle tube and is configured to be clamped against a supporting surface on the axle stub, and wherein in the assembled state of the axle system the threaded pin secures the axle tube and the axle stub to one another in a positively interlocking engagement.

5. The axle system as claimed in claim 3, wherein the axle stub is configured to be inserted into the axle tube such that a holding plane running at right angles to the stub axis intersects the axle stub, the axle tube and the clamping unit.

6. The axle system as claimed in claim 5, wherein the axle tube in an overlapping area with the axle stub comprises at least one slot, and wherein the slot extends substantially parallel to the tube axis.

7. The axle system as claimed in claim 3, wherein the axle stub and the axle tube are configured to be clamped against one another in such a way that a contact area between the axle stub and the axle tube lies substantially in a holding plane running at right angles to the stub axis, and wherein the clamping unit extends mirror-symmetrically about the holding plane and/or is intersected by the holding plane.

8. The axle system as claimed in claim 3, wherein the axle stub comprises a locking portion, which is configured to engage through positive interlock and/or non-positively on the axle tube in the assembled state.

9. The axle system as claimed in claim 8, wherein at least a portion of the locking portion is conically pyramid-shaped.

10. The axle system as claimed in claim 3, wherein the clamping faces are configured to be brought into engagement with the axle tube, and wherein the axle tube is deformable in the area of the holding faces such that the axle tube is configured to be clamped to the axle stub.

11. The axle system as claimed in claim 1, wherein one of the clamp parts comprises a brake carrier.

12. The axle system as claimed in claim 1, wherein the clamping angle is between 40° and 50°.

13. The axle system as claimed in claim 1, wherein one of the clamp parts comprises an internal thread, with which the force element is configured to engage.

14. The axle system as claimed in claim 1, wherein the clamping face on each clamp is one of two clamping faces on each clamp part that form a V-shape with one another, and wherein an open side of the V-shapes in the assembled state supports a holding face on the axle tube and a holding face on the axle stub.

15. The axle system as claimed in claim 1, wherein the axle tube that is substantially rotationally symmetrical about a tube axis, and wherein the axle tube is configured to be clamped against the axle stub by the clamping unit when in the assembled state, such that the stub axis and the tube axis run collinearly with one another.

16. The axle system as claimed in claim 15, wherein the axle tube and the axle stub are configured to be brought into interlocking engagement, the clamping unit comprises a threaded pin, which engages in an aperture on the axle tube and is configured to be clamped against a supporting surface on the axle stub, and wherein in the assembled state of the axle system the threaded pin secures the axle tube and the axle stub to one another in a positively interlocking engagement.

17. The axle system as claimed in claim 15, wherein the axle stub is configured to be inserted into the axle tube such that a holding plane running at right angles to the stub axis intersects the axle stub, the axle tube and the clamping unit.

18. The axle system as claimed in claim 17, wherein the axle tube in an overlapping area with the axle stub comprises at least one slot, and wherein the slot extends substantially parallel to the tube axis.

19. The axle system as claimed in claim 15, wherein the axle stub and the axle tube are configured to be clamped against one another in such a way that a contact area between the axle stub and the axle tube lies substantially in a holding plane running at right angles to the stub axis, and wherein the clamping unit extends mirror-symmetrically about the holding plane and/or is intersected by the holding plane.

20. The axle system as claimed in claim 15, wherein the axle stub comprises a locking portion, which is configured to engage through positive interlock and/or non-positively on the axle tube in the assembled state.

21. The axle system as claimed in claim 20, wherein at least a portion of the locking portion is conically pyramid-shaped.

\* \* \* \* \*